Oct. 18, 1949.　　　R. A. BECKWITH　　　2,484,811
BOOSTER CLUTCH MECHANISM
Filed Nov. 7, 1944　　　5 Sheets-Sheet 1

Inventor
R. A. Beckwith
By Robert Cobb
Attorneys

Oct. 18, 1949.   R. A. BECKWITH   2,484,811
BOOSTER CLUTCH MECHANISM
Filed Nov. 7, 1944   5 Sheets-Sheet 2

Fig.3.

Inventor
R. A. Beckwith
By Robert Robb
Attorneys

Oct. 18, 1949.                 R. A. BECKWITH                  2,484,811
                           BOOSTER CLUTCH MECHANISM
Filed Nov. 7, 1944                                         5 Sheets-Sheet 3

Inventor
R. A. Beckwith
By Robb & Robb
Attorneys

Oct. 18, 1949.   R. A. BECKWITH   2,484,811
BOOSTER CLUTCH MECHANISM
Filed Nov. 7, 1944   5 Sheets-Sheet 5

Patented Oct. 18, 1949

2,484,811

UNITED STATES PATENT OFFICE 2,484,811

BOOSTER CLUTCH MECHANISM

Raymond A. Beckwith, Milwaukee, Wis., assignor to Koehring Company, Milwaukee, Wis., a corporation Application November 7, 1944, Serial No. 562,313

15 Claims. (Cl. 192—36)

My present invention pertains primarily to the art of heavy duty clutches and the clutch hereof has been developed primarily with a view to its employment upon power cranes or shovels in which exceptionally heavy loading of the operating means of the machine is commonly experienced. In this type of clutch means, in order to eliminate undue shocks to the machinery, the action of the clutch devices employed must be of such a nature that they will pick up the tremendous loads in a manner that will not promote a shock load application. In other words, the clutch devices should not give quick positive engagement similar to that which is derived in the use of ordinary jaw clutch mechanisms.

In the art of cranes and shovels, the heaviest loaded clutches are commonly of the drum operated types, cable drums being employed to hoist and lower heavy loads and similar drums utilized in order to operate the power shovel instrumentalities. In smaller machines the above clutches are ordinarily hand-actuated or, in other words, the hand pull or effort of the operator on a clutch lever is not magnified by any energy or power producing arrangement, but obtained by the lever ratios between the hand lever or similar operating instrumentality and the clutch actuating or shifting collar.

In machines of the type referred to, when larger clutches are utilized, it is necessary to develop an amplification of the lever pull of the operator through provision of some mechanical means which will make use of the source of power from the motor or driving medium for the machinery. In certain instances this amplification in the hand pull of the operator for handling the heavy shifting loading of the larger clutches is derived from air pressure, the air compressor of the associated machine being driven by the motor and certain valves being automatically actuated during the clutch operation cycle for acquiring the desired load amplification. In other cases a small clutch is sometimes provided and actuated by the operator and produces the force necessary to actuate the main driving clutch. It has also been proposed to employ hydraulic devices in the above connection, taking advantage of oil pressure that is held constant by power derived from the main power unit which operates the entire machinery in conjunction with which the clutch mechanism or mechanisms are availed of.

None of the foregoing booster arrangements or amplification means for the power effort of the operator affords to the operator the so called sense of feel between the loading upon the clutch and the load application of his hand at the lever that controls the application of the clutch to a greater or less extent as required. When the operator does not have this so-called "feel," he has no appreciation of the abuse that the machine which he is working is being subjected to, or the shock loading which the machinery must incur in operation.

It has therefore been a particular object in designing my invention to develop a clutch in which the clutch engagement cannot go into effect so quickly that it will in effect develop a shock or sudden engagement. Furthermore, there should be a method of operation for the clutch mechanism in which any sudden load upon the shovel, crane, or other machinery, is capable of being felt by the operator, thus giving him a warning, so that immediately upon the possibility of shock loading, he can relieve the machine of such loading before undue strains become effective to possibly damage the machine.

In setting steel, as one instance, it is very important that the operator of cranes has a sense of feeling relationship between the load he is handling within control limit. This cannot be obtained when there is not a close relationship between, say, the air control, hydraulic, or miniature clutch control, etc., all of which break the relationship between the hand lever pull and the load handled by the operator. For the above reasons some type of booster type arrangements that have been developed heretofore cannot be employed on cranes for setting steel, an unusually difficult job. Therefore, such cranes are often forced to apply or use fully hand operated clutches to retain the above feel control relationship, and on this account the strain of effort on the part of the operator is very great, something of course undesirable in this type of machine.

With the foregoing in view, therefore, the clutch of my invention supplies the desired requirement of affording the "feel" to the operator without the use of air pumps, hydraulic pumps, or independent miniature boosting clutches or brakes of the ordinary types heretofore proposed. A novel miniature brake or boosting device is employed which, however, is worked in series between the hand lever and the final clutch (the main operating clutch) in a manner that its action synchronizes its load application between the main clutch and the hand lever. In this type of clutch of my present invention hereinafter set forth, the application of the clutch is controlled beyond a certain point by the R. P. M. of the clutch spider or driving member of the clutch unit, and can be applied more slowly but no faster than the R. P. M. of the clutch spider itself. The speed of the driving action of the clutch spider is too slow to give rise to any shock during its application. In the practical use of the clutch mechanism of my invention the foregoing resulting operation features have been proved by test. For instance, a test has been made using a 37 inch clutch driven by a 135 H. P. motor driving a drum handling a single cable attached to a load of 8,000 lbs. This 8,000 lbs. was lifted up to 60 feet by the clutch, at which time the clutch was completely released with no braking effect, dropped 20 feet, and stopped within the next 10 feet by the clutch only, at which time there was no sudden shock incurred or observed. Moreover, there was no chattering and the return lift of the clutch was under the full control of the operator. So far as I am aware, this is a performance of clutch mechanism that I have never been able to experience in the use of previous clutch devices or mechanisms heretofore used by me in a very wide experience in this particular field of clutch development and operation of prior types of mechanism. On the above account, it is clear that the characteristic operation of my clutch is effectively almost parallel in its control phases to the hand operated clutch, with the added feature, however, that in my present invented clutch the clutch cannot be operated fast enough to create such shock loading as is experienced in many hand operated types of mechanism. In addition to the foregoing features of operation of my invention, the operator's hand pull with a 37 inch clutch has been found sufficient to stall a 130 H. P. motor, showing the ease of operation, which is, of course, another object of any booster type of clutch arrangement, namely, to reduce the hand pull down to some predetermined force low enough to eliminate the fatigue of the operator, the force in this particular instance of my example above given being 10 lbs.

In the carrying out of my invention I utilize, of course, the necessary usual manually controlled operating lever for my clutch operation, but I have associated with this lever certain gear mechanism, including an operating gear driven by the constantly driven main operating shaft for the spider of the clutch, and a secondary gear adapted to be operated from said operating gear through the inter-position of a train of gears or pinions affording a differential and planetary action on the part of the latter in their cooperation with the operating and secondary gears. By the above arrangement of parts, including certain other connecting features, I am enabled to utilize the power of the prime mover driving the operating gear, to cause an action of the pinion unit connecting the operating and secondary gear which will avail of movement of the pinion unit transmitting a power effort to the manual operating means to supplement the manual effort of the operator of the machine.

By the employment of the instrumentalities above referred to, I am enabled to obtain an operation of the manual means by which the "feel" of the operator in regard to the action of loading the clutch is retained, and this phase of my invention is of large importance by way of improvement, for the reasons hereinbefore referred to.

The construction and operation of my novel clutch mechanism will be understood upon reference to the following detailed description, in conjunction with the accompanying drawings, in which—

Figure 3 is a sectional view of the general clutch mechanism including the driving shaft operated by the driving gear, the clutch drum, clutch spider, and my booster mechanism associated with these parts, the cable drum which is integral with the clutch drum being partly broken away.

The various features of my novel clutch operating mechanism will now be set forth in detail, similar reference characters referring to like parts throughout this description and in the drawings.

*Operating lever and linkage*

Figure 1:
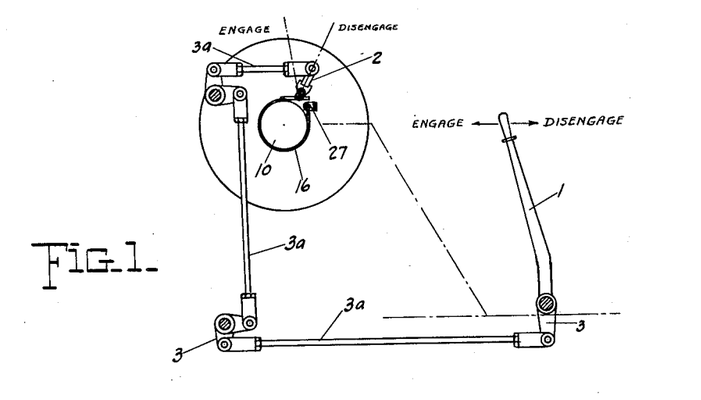
Figure 1 is a somewhat diagrammatic view of the manual operating parts associated with my clutch mechanism.

Figure 1 shows the hand operated lever 1 which operates a control lever 2 through the provision of suitable crank levers 3 and connecting link members 3a. The function of the control lever 3 will appear more fully hereinafter, and it is arranged adjacent to the main clutch mechanism, by which the cable drum of the crane machine, or other equivalent part, if the clutch is used elsewhere than for such machines, is operated. The general construction of the clutch unit will now be described, the same being of a generally known type employed on power shovels, cranes, or the like.

*Clutch mechanism*

Figure 2:
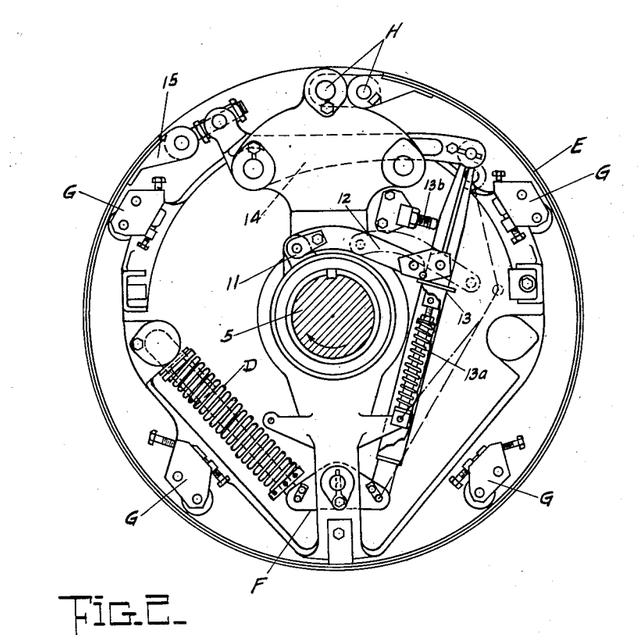
Figure 2 is a view in elevation of the driving clutch member or spider illustrating the clutch band operating features thereof.

Reference is made particularly to Figures 2 and 3 of the drawings in which A denotes the internal clutch drum or driven member, the same integral, as customary, with the lagging B of a common type of cable drum that is to be rotated by application of the clutch means for raising loads or performing other operations for which clutches may be provided in a crane or shovel machine.

The parts A and B are mounted on the power driving element or live drum shaft 5 to which they are to be drivingly connected by my clutch means, and this shaft 5 is rotated at a constant relatively low R. P. M. Shaft 5 is driven by the main hoist gear K keyed thereto and to the clutch spider C within the clutch drum A. As to clutch details shown in Figure 2, the spring D is a known form of heat compensating spring for maintaining the adjustment of the clutch parts under varying degrees heating of the clutch while in working operation.

The means to apply and release the main clutch band E of the drum A, see Figure 2, includes the clutch shifting toggle 13 connected at one end with the live end lever 14, in turn connected to the live end 15 of the band E. The other end of the toggle 13 is connected to the lever F, the latter serving to transmit the direct movement of this end of the toggle to the spring D before mentioned. Roller and bracket units G are for adjusting the clutch band clearance during the disengaged period of the clutch, and the pins H are the dead end clutch band pins that carry the entire torque load delivered by the clutch.

The spider C as a mounting, and clutch band E and clutch shifting toggle unit or lever 13, with intermediate connections, carried thereon, are constantly driven from the driving shaft.

A spring 13a assists in holding outward the toggle 13 in the clutch band disengaged position, and a set screw 13b affords adjustment for the amount of back lock for the clutch means when fully engaged.

I do not wish to be limited to the clutch details above explained because my booster control mechanism of my invention may be adapted to other constructions of operating clutches.

*Booster mechanism for manual operating means*

Figure 4:
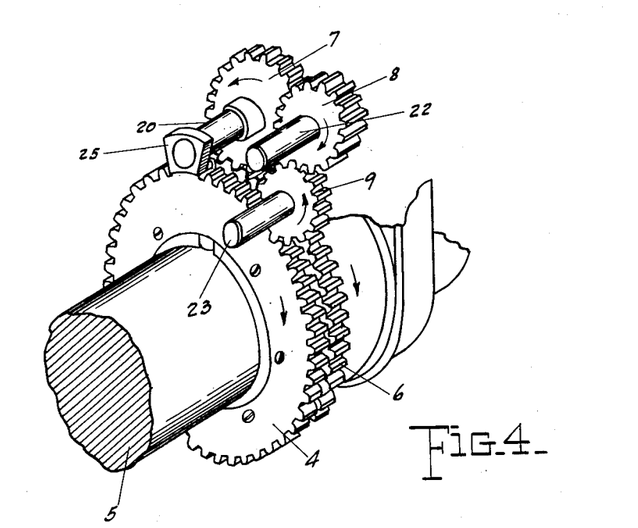
Figure 4 is an isometric perspective view illustrating the operating gear on the operating shaft, the secondary gear, and the gear train or pinion unit connecting these gears.
Figure 5:
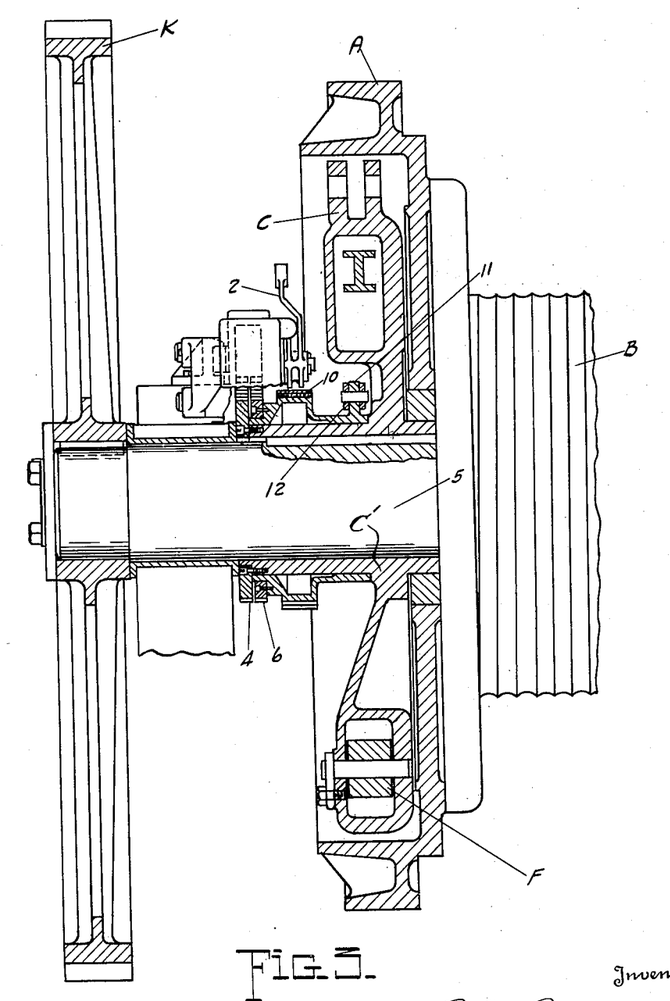
Figure 5 is a vertical sectional view taken through the upper portion of the operating and secondary gears, the brake drum attached to the secondary gear and the gear unit which connects the said gears together, the section being taken about on the line 5—5 of Figure 7.

As seen best in Figures 1, 2, and 4, on the hub C' of the clutch spider C is provided a loose brake drum 10 having the brake member 10a, an inner end lug 11 connected by a link 12 to the toggle 13, and having affixed to its outer end the relatively large gear 6. At the outer side of the gear 6 is a similar gear 4, of like diameter, and secured to the hub C' of the spider C so that it is constantly driven at low speed by the live drum shaft 5 to which the spider C and gear K are keyed as described.

Now the gear 6 and its drum 10 are driven normally by gearing including a pinion 9 on shaft 23 and meshing with the driving gear 4, a double gear 8 on shaft 22 and meshing with the gear 9, and a gear 7 meshing with gear 8, also meshing with the driven gear 6. Gear 7 is carried by the shaft 20.

When no operating action of the booster mechanism is in effect, the tooth speeds of all the above gears are the same.

I provide a gear case 19 which supports at its upper end the shaft 22 and is pivotally mounted at its lower end on the shaft 23, the latter being fixedly mounted by screw 23a in the supporting casing or casting 18 mounted on the frame of the machine. Another gear case 21 pivots on and about the shaft 22 and houses the two gears 8 and the gear 7.

Figure 8:
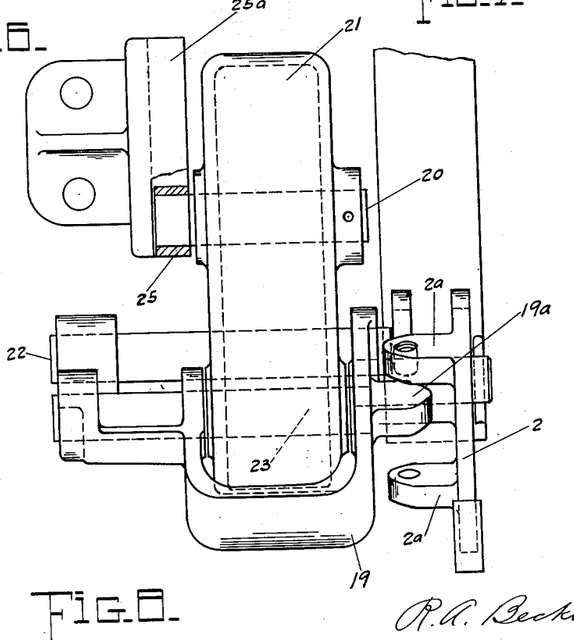
Figure 8 is a top plan view showing more clearly the encasing parts for the gear train or gear unit, and the guide means for the planet gear of said unit.
Figure 9:
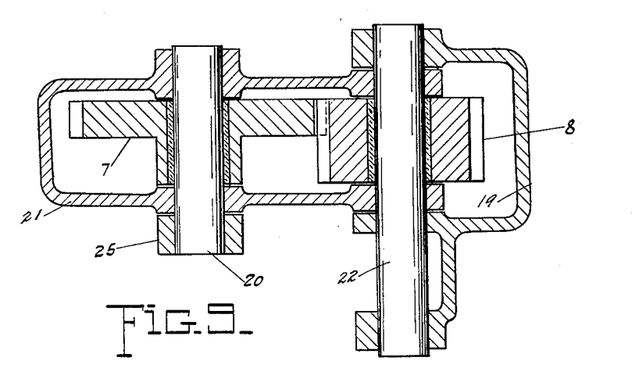
Figure 9 is a sectional view of certain of the pinions of the gear unit and the gear cases therefor.

The shaft 22 moves in an arc with the shaft 23 as an axis and also around shaft 20. For maintaining the gear 7 in mesh with the gear 6 at all times a sliding shoe 25, see Figure 8, is carried by the shaft 20 and moves in a stationary guide 25a concentric with the axis of gear 6, which is the shaft 5. In this manner all the gears are properly kept in mesh regardless of the position of the shifting gears 7 and 8 during the manual clutch actuation, and the automatic boosting clutch action to be described.

Figure 6:
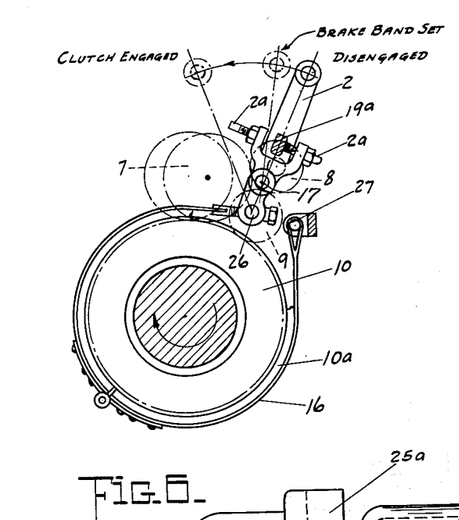
Figure 6 is a sectional view through the driving shaft and showing more clearly the arrangement of the control lever which is operated from the manual lever at the operator's station, the pinions of the gear unit connecting the operating and secondary gears illustrated diagrammatically and the brake drum for the secondary gear fully shown, with its brake band arrangement.

On the case 19 is carried a pivot pin 17 affording a mounting for the control lever 2 previously referred to as operatively connected with the manual lever 1, and said lever 2 has spaced lugs on the side thereof carrying set screws 2a, between adjacent ends of which is received a lug 19a offstanding from the case 19, and in the use of my booster mechanism the screws are spaced from the lug 19a as seen in Figure 6.

Surrounding the portion 10a of the brake drum 10 is a brake or stop band 16, dead ended at 27, and connected at its live end by swivel pin 26 to the control lever 2 at the lower bifurcated end of the latter.

The connections including parts 3, 3a, 2, 19, 21, 7, 8, 6, 10, 11, and 12, and clutch shifting toggle 13, are live connections between the manual device or lever 1, and the clutch band E immediately or initially responsive to the movement of said lever 1 for clutch loading by relative displacement of the rotative parts or gears 4 and 6. The brake band retarding element or unit 16 is supplementally responsive to the movement of the manual lever or device 1, so that the force impressed on the latter is magnified through the drum 10 for the retarding effect on the latter by which further relative displacement of the rotating gears 4 and 6 is controlled, thus to augment the manual effort applied at the lever 1 for increasing mechanically by power derived from the driving element 5 the clutch loading. The power application of the clutch devices is effected by force parallel with that constantly applied or maintained on the lever 1, and proportionate thereto, until the clutch is completely engaged.

*Booster operation of clutch mechanism*

When the manual lever 1 is operated, the control lever 2 is likewise rocked and applies the brake band 16 to the brake member 10a of drum 10, thereby stopping the rotation of said drum and the gear 6. Under this condition the pinion 7 acting after the manner of a planet gear will climb forwardly because it is driven by the gearing 4, 9 and 8 under the drive from the shaft 5. When pinion 7 moves bodily as indicated, it moves the pinion 8, gear case 19, and the lever pivot pin 17. In fact, when band 16 is tight on brake member of the drum 10, the parts 19, 21, 7, and 8 travel as a mass counterclockwise to rotation of the shaft 5, synchronizing with hand movements a relatively large automatic clutch loading to the hand pull. The movement of the pin 17 (and lever 2) is in direct ratio to that of the lever 1 and in the same direction, and while the load is applied to lever 1, band 16, and drum 10, the stopping or holding of the drum 10 will cause the lug 11 of the latter to pull toggle 13, incident to continued rotation of the spider C, over the center line to effect engagement of the main clutch band E with the internal clutch drum A. In other words, when manual force is applied to the lever 1, and only to the extent of half of the lever stroke, the clutch will be half-applied only, and the extent of such partial application can be regulated by incomplete movements of lever 1 as the operator desires. This is due to the constant relationship between the load on the clutch band 16 and location of the pin 17 at all times. Since the application of the band 16 to drum 10 is such that the latter may be momentarily retarded or stopped in its rotation, the main clutch E cannot be applied any faster than the R. P. M. of the shaft 5 and gear 4 permits.

If the drum 10 is stopped long enough, the clutch E—A is backlocked in engagement, thereby permitting the operator to relieve the manual operating pressure on the lever 1 until it is desired to reversely operate the lever 1 to fully or partly disengage the clutch A—E.

Reverse movement of lever 1 operates the pin 17 reversely and causes shifting of the pinion 7 tangential to the axis 5 and gear 6. This will rotate the gear 6 manually faster than the gear 4 and such differential movement of the two gears will manually throw out the toggle 13 to clutch disengaging position.

The disengagement of the clutch AE is solely by manual power, and not by any power effort delivered to the booster gearing described.

In the application of the clutch there are two parallel forces tending to apply the clutch band E. The manual effort of the operator on lever 1 transmitted to the lever 2 works parallel to the loading of the drum 10, while the band 16 is applied to the drum 10. These two loads work parallel to each other, or supplementally, in applying the clutch maintaining a definite relationship between the hand applied load of the operator at lever 1, and the additional loading effected automatically by the action of the booster gearing also initiated by the said hand applied load or force.

The booster gearing is a means of hooking up the movement of the manual handle 1 directly to the movement of the toggle 13, so the movements of both are synchronized completely. The extra force obtained from the booster gearing so synchronized depends entirely upon the operator effort put in at the lever 1.

Obviously, after removing the brake band 16, and when the screws 2a are both tightened on the lug 19a of case 19, the clutch mechanism becomes manually operable only. This is desirable for some operations in the uses of hoisting or like means. When the mechanism is thus rendered wholly manually controlled in action, the pin 26 is inactive to function because the band 16 is not used. Under these conditions differential action takes place between the gears 4 and 6 while the lug 11 and link 12 are operated by direct pull of the manual lever 1.

The spider C of the clutch is its driving clutch member and the drum A is the driven clutch member. While the drum 10 is for convenience and compactness mounted on the spider hub, it could be supported elsewhere and afford its operability as a function of the mechanism. The drum 10 and lug 11 constitute an actuating unit for the instrumentalities 12, 13, 14, and E that clutch together the members C and A. Pinions 7, 8, and 9 form a gear unit.

In the following description of operation of the clutch mechanism we will assume that the engine driving shaft 5 and its power gear 4 are rotating in the direction of the arrow, Figure 4, so that the gear 6 and its connected drum 10 and its associated linkage 11, 12 and 13, and the clutch spider C, are all rotating in the same direction and at the same speed as said power gear 4, when the hand lever 1 is in its neutral or disengaged position.

To engage the clutch, the operator pulls the lever 1 counterclockwise, as seen in Figure 1, the force passing through lower horizontal rod 3a connected to and turning bell-crank 3 counterclockwise. This action raises the vertical rod 3a rotating the upper bell-crank counterclockwise and also the lever 2, as seen in Figure 1, and Figure 6.

Figure 7:
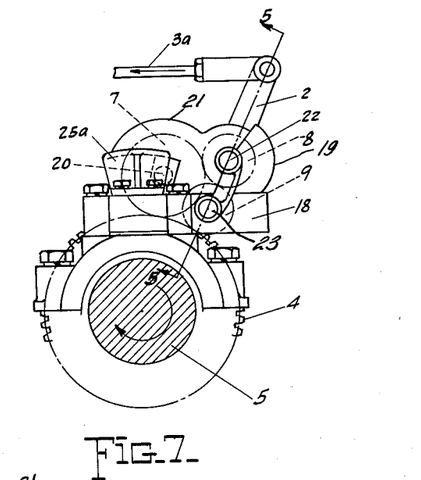
Figure 7 is a view somewhat similar to Figure 6 except that the various parts, excepting the shaft, are illustrated in side elevation as they will be seen from one side of the arrangement.
Figure 10:
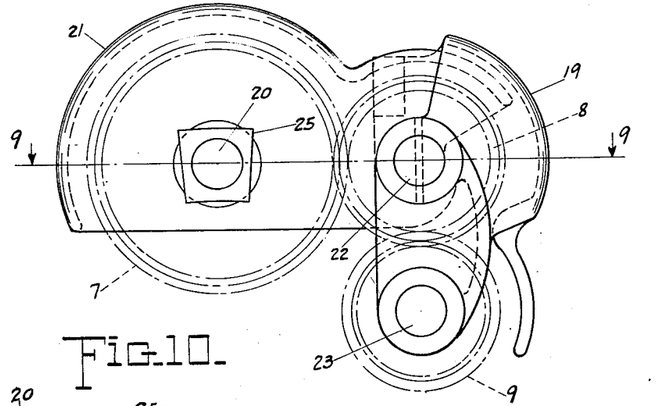
Figure 10 is a side view of the gear case assembly.
Figure 11:
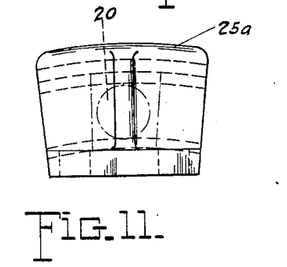
Figure 11 is a side view of the guide block or member.
Figure 12:
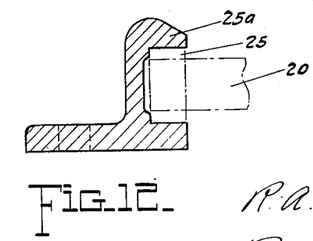
Figure 12 is a sectional view of said guide block or member.

The first manual movement of the hand lever 1 causes a leftward displacement of the articulated gear housings 19 and 21, as seen in Figures 4, 7, and 10, the housing 19 pivoting counterclockwise about the axis of shaft 23 and housing 21 pivoting about the axis of shaft 22, as seen in said figures, the leftward movement of housing 21 carrying with it gears 7 and 8, gear 7 being maintained in mesh with gear 6 and with gear 8, and the latter gear being maintained in mesh with gear 9 under such condition. This action is due to the pivotal connection of the lever 2 with the housing 19 through the pin 17. This action tends to slow down gear 6 and cause relative rotational displacement of gears 4 and 6 which through link 11 causes an initial pulling movement of toggle 13, the latter carried by the constantly moving spider C, until clutch band E slightly engages drum A, at which time resistance is met tending to prevent further leftward displacement of housings 19 and 21.

At this time further counter-clockwise movement of the lever 1 now causes the lever 2 to pivot counter-clockwise on pin 17 as seen in Figures 1, 6, and 7, causing tightening of the brake band 16 so that the same is frictionally applied to the brake drum 10, thereby tending to hold the drum 10 and gear 6 stationary while the spider, with the clutch toggle 13, continues to turn at the normal driving speed of the shaft 5 in the direction of the arrows shown in Figure 4. The lug 11 and drum 10, see Figure 2, may be said in this action to be so retarded from rotation, or even momentarily stopped, that the continued turning clockwise movement of the spider C and the toggle 13 carried thereon results in a leftward pull being exerted on the link 12 connected to lug 11, as seen in Figure 2, causing the clutch applying or straightening action of the toggle and corresponding clutch application of the clutch band E to the clutch drum A. In other words, the mechanical power of shaft 5 directly driving the spider C effects the application of main clutch E coincident with and supplementing the manual power applied to the hand lever 1. The above operation continues as described as long as the clutch applying movement of the lever 1 is continued, until the toggle 13 reaches its back-lock position shown in full lines in Figure 2, at which time the clutch parts E and A are fully engaged. At such time the hand may be removed from the lever 1 without affecting the operation of the clutch in any way. At any time, if the said pull on the lever 1 is reversed, the manual effort of the pull will be exerted to produce movement of the gear housings 19 and 21, through the movement of the pin 17, to disengage the clutch instantly, as previously described, by causing rotational displacement of gear 6 relative to gear 4, in the direction of arrows, Figure 4, thereby acting through drum 10, lug 11, and link 12, to move toggle 13 to clutch releasing position.

If, during the clutching operation by action of the lever 1, the manual movement of the lever 1 is stopped, holding the load by the lever, however, the tightening action of the band 16 remains proportioned to the force that holds the lever 1 at the point to which it has been moved. At such stage the pulling force of the spider rotation at the link 12 maintains clutch loading constant until the latter is increased, or the clutch E disengaged entirely. In other words, the degree of frictional engagement of the parts of the main clutch remains constant and proportional as fixed by the hand force on lever 1 to the friction produced between the band 16 and drum 10 tending to stop the drum and the gear 6.

Since the pin 17 is a means for transferring the hand lever load both in travel and force to the main clutch toggle 13 and parallel to the load exerted through lug 11 from the friction of band 16 on the drum 10a, it is possible for the operator to acquire a definite relationship of his lever pull to that of the pulling power of the main clutch, giving what I call the "feel" of the operator respecting the amount of pulling load the clutch is handling. In other words, in the design of clutch means shown, for example, for every pound of pull of the operator at the lever 1 the clutch toggle 13 is receiving from the lever 1, lug 11, and also lever 2, ten times such pull. In other words, every pound pull of the operator gives a clutch application force magnified ten times.

Under normal operation, for example, it takes twenty pounds at the lever to engage the clutch totally. In the linkage hookup, illustrated in Figure 1, when the operator pulls ten pounds his hand lever movement is one half the total hand travel distance. Therefore, since the travel and the load are always relative the operator has a complete "feel" of the clutch loading present, enabling him to govern his clutch position and hand pull to the working loading requirements at that immediate time.

Referring to Figure 4, the pinion 9 meshes with gear 4 and also meshes with gear 8; gear 8 in turn also meshes with gear 7 and gear 7 meshes with gear 6. Therefore, when the brake band 16 is applied to the drum 10a, which is attached to gear 6, gear 6 is slowed up causing gear 7 to climb forward or to the left on gear 6, as seen in Figure 4, and since shaft 20 is linked to shaft 22 by gear case 21, and shafts 22 and 23 are linked by gear case 19, the gear mesh of gear 8 between gears 7 and 9 is retained as gear 7 crawls leftward. Gear 7 must crawl forward or left since it is being driven at a constant speed by gear 4 and therefore as gear 7 so travels, the same being linked to gear case 19, the pin 17 is also carried forward as well as being forced forward by hand lever 1 pull. This illustrates the hookup between lever movement and the power exerted on hand operating lever 1.

Another way to describe the "feel" or load relationship between operator and the clutch application is as follows, referring to Figure 4: The gears 7 and 9 are hooked together in rotation upon their own axis; also the gear 7 and shaft 20 are tied up in their lateral movements to the hand lever 1. The hand lever load is divided between brake band 16 application force and lateral movement to the left of the gear 7 and shaft 20. Therefore, since the gears 9 and 7 are tied together, any lateral force exerted on the lateral travel of the gear 7 is also transferred to gear 6 which meshes with the gear 7, moving gear 6 bodily. Thus, the turning load on the drum 10 from the brake band 16, and the turning load created or derived from the hand lever 1 create the lateral movement of the gear 7, and these loads work parallel in applying the main clutch band E through the movement of the lug connection 11. It is the paralleling of these two loads which gives to the operator his direct feel or contact in the movement or application action of the main clutch driving band E, see Figure 2.

In a full manual clutch the "feel" of the operator is always present. In actual use of my clutch mechanism herein, when applying the main clutch E partially by hand, since it is definitely tied and associated with the booster application actuating means herein described, the operator has the same feel operating characteristics as obtained in a full or wholly manually applied clutch.

In fact in actual use of my clutch it is found that the operator has better control in holding a suspended load in the power clutch application than obtained with a wholly manual clutch application. The foregoing has been ascertained by disconnecting the booster band 16 and tightening screw 2a, whereby my clutch becomes full manual operated.

Having thus described my invention, what I claim as new and desire to secure by Letters Patent of the United States, is:

1. In a machine of the class described, in combination, a power driving element, a member to be driven thereby, clutch mechanism for drivingly connecting said member to said element including clutch shifting parts and their mounting connected to and continuously driven by said element, manual means for actuating said clutch parts, live connections between said manual means and said clutch parts for actuating the latter and through which the operator maintains the feel of the clutch loading to the driven member at all times until the clutch is fully engaged, and instrumentalities operable by the manual means and cooperating with the said live connections to act on the constantly driven clutch parts to cause the same to supplement the manual force applied to the clutch shifting means with clutch applying force greater than that impressed manually upon the said manual means.

2. In a machine of the class described, in combination, a power driving element, a member to be driven thereby, clutch mechanism for drivingly connecting said member to said element including clutch shifting parts and their mounting connected to and continuously driven by said element, manual means for actuating said clutch parts, live connections between said manual means and said clutch parts for actuating the latter and through which the operator maintains the feel of the clutch loading to the driven member at all times until the clutch is fully engaged, and instrumentalities operable by the manual means and cooperating with the said live connections to act on the constantly driven clutch parts to cause the same to supplement the manual force applied to the clutch shifting means with clutch applying force greater than that impressed manually upon the said manual means, said connections including relatively displaceable members under control of the manual means.

3. A machine as claimed in claim 1, in which the continuously driven clutch parts include a revolving spider and a toggle lever unit for clutching application and release of the clutch parts, and in which the live connections are connected to the said toggle unit, the manual means being operable on the live connections to act on the joint of the toggle lever unit for clutch application.

4. A machine as claimed in claim 1, in which the continuously driven clutch parts include a revolving spider and a toggle lever unit for clutching application and release of the clutch parts, and in which the instrumentalities comprise a drum operated by the power driving element retardable by the manual means, and connections between said drum and the toggle unit to cause clutch applying action of the latter as it is continuously driven.

5. A machine as claimed in claim 1, in which the instrumentalities claimed comprise a device for retarding the movement of certain of the clutch shifting parts to utilize the energy of the continuously driven clutch member to supplement the manual force in the manner stated.

6. In a machine of the class described, in combination, a power driving shaft, a member to be driven thereby, clutch mechanism for drivingly connecting said member to said shaft including clutch shifting parts and their mounting connected to and continuously driven by said shaft, a manual clutch shifting lever, live operating connections between the lever and said constantly driven clutch shifting parts for actuating the latter and through which the operator maintains the feel of the clutch loading to the driven member at all times until the clutch is fully engaged, said connections including operating linkage and a first rotative device movable by said linkage for controlling clutch application of the clutch shifting parts, a second rotative device connected to the driving shaft and driven thereby, connections between the said rotative devices for compelling their simultaneous rotation but permitting relative rotative displacement, and a part operable by the manual lever to effect displacement of said first device relative to the second device to actuate the clutch parts for clutch loading, and a unit connected to the manual lever operable thereby to connect it with the driving shaft to further effect such displacement with force derived from the driving shaft through said rotative devices operated thereby.

7. In a machine of the class described, in combination, a power driving shaft, a member to be driven thereby, clutch mechanism for drivingly connecting said member to said shaft including clutch shifting parts and their mounting connected to and continuously driven by said shaft, a manual clutch shifting lever, live operating connections between the lever and said constantly driven clutch shifting parts for actuating the latter and through which the operator maintains the feel of the clutch loading to the driven member at all times until the clutch is fully engaged, said connections including operating linkage and a first rotative device movable by said linkage for controlling clutch application of the clutch shifting parts, a second rotative device connected to the driving shaft and driven thereby, connections between the said rotative devices for compelling their simultaneous rotation but permitting relative rotative displacement, and a part operable by the manual lever to effect displacement of said first device relative to the second device to actuate the clutch parts for clutch loading, and a unit connected to the manual lever operable thereby to connect it with the driving shaft to further effect such displacement with force derived from the driving shaft through said rotative devices operated thereby, said unit comprising means to magnify the manual force impressed on the said lever for clutch loading.

8. A machine as claimed in claim 6, in which the relatively displaceable devices consist of gears, and the connections between said devices include gear parts meshing with the above mentioned gears, one of which gear parts is connected to be operated by the lever operated displacing part.

9. Clutch mechanism comprising a driving element, a driven member, clutch devices therebetween, power means operated by the driving element to apply the clutch devices for clutch loading thereof, a manual operating device, live connections between the manual device and the clutch devices to effect manual clutch application thereof according to the manual effort applied to the manual device and through which the feel of clutch loading by manual force exerted on the manual device is obtainable at all times, and instrumentalities operable by said manual device whilst the clutch loading feel is transmitted to the manual device to control the power means to act on the clutch devices to apply the latter with a force augmenting that impressed on the manual device.

10. Mechanism as claimed in claim 9, in which said instrumentalities include a member acting under the control of the manual device to multiply the force impressed on the manual means.

11. Clutch mechanism comprising a driving element, a driven member, clutch devices therebetween, power means operated by the driving element to apply the clutch devices for clutch loading thereof, a manual operating device, live connections between the manual device and the clutch devices to effect manual clutch application thereof according to the manual effort applied to the manual devices and through which the feel of clutch loading by manual force exerted on the manual device is obtainable at all times until the clutch is fully engaged, and other means operable by the power means and controlled by the manual device, whilst the clutch loading feel is maintained through said live connections to the said manual device, to supplementally actuate the clutch devices to apply the latter with a force augmenting that impressed on the manual device.

12. Clutch mechanism comprising a driving element, a driven member, clutch devices therebetween, power means operated by the driving element to apply the clutch devices for clutch loading thereof, a manual operating device, live connections between the manual device and the clutch devices to effect manual clutch application thereof according to the manual effort applied to the manual devices and through which the feel of clutch loading by manual force exerted on the manual device is obtainable at all times until the clutch is fully engaged, instrumentalities operable by said manual device whilst the clutch loading feel is transmitted to the manual device to cause the power means to act on the clutch devices to apply the latter with a force augmenting that impressed on the manual device, including removable connections between said instrumentalities and the manual device detachable for discontinuing augmenting of the force impressed on the manual device by the power means without affecting the operating connection of the manual device with the live connections.

13. Clutch mechanism comprising a driving element, a driven member, clutch devices therebetween, power means operated by the driving element to apply the clutch devices for clutch loading thereof, a manual operating device, live connections between the manual device and the clutch devices to effect initial manual clutch application thereof according to the manual effort applied to the manual device and through which the feel of clutch loading by manual force exerted on the manual device is obtainable at all times until the clutch is fully engaged, and instrumentalities operable by said manual device whilst the clutch loading feel is transmitted to the manual device to transmit power from the power means to act on the clutch devices to apply the latter subsequently to the initial manual application with a force augmenting that impressed on the manual device.

14. Clutch mechanism comprising a driving element, a driven member, clutch devices therebetween, power means operated by the driving element to apply the clutch devices for clutch loading thereof, a manual operating device, live connections between the manual device and the clutch devices to effect initial manual clutch application thereof according to the manual effort applied to the manual devices and through which the feel of clutch loading by manual force exerted on the manual device is obtainable at all times until the clutch is fully engaged, instrumentalities operable by said manual device whilst the clutch loading feel is transmitted to the manual device to transmit power from the power means to act on the clutch devices to apply the latter subsequently to the initial manual application with a force augmenting that impressed on the manual device, connecting parts removable to render said instrumentalities inoperable by the manual device, and other connecting parts to rigidly connect the manual device to the live connections for operation of the clutch devices, whereby the clutch devices may be applied and released solely by manual effort impressed thereon.

15. In a clutch mechanism, in combination a power driving element, a clutch member to be driven, a driving clutch member constantly operated by the power driving element, clutch devices to connect the driven clutch member to the driving clutch member, a manual operating means for the clutch devices, live moving connections between the manual means and said clutch devices maintaining the feel of clutch loading on the manual means, and instrumentalities controlling the clutch devices to apply the force of the power driving element thereto to supplement the force manually impressed on the manual means, and parts connecting the said instrumentalities with the manual means for operating the instrumentalities while the feel of the manual clutch loading is uninterrupted.

RAYMOND A. BECKWITH.

REFERENCES CITED

The following references are of record in the file of this patent:

UNITED STATES PATENTS

| Number | Name | Date |
|---|---|---|
| 558,691 | King et al. | Apr. 21, 1896 |
| 1,054,666 | Barker | Mar. 4, 1913 |
| 1,585,112 | Ridgway | May 18, 1926 |
| 1,778,220 | Lange | Oct. 14, 1930 |
| 1,866,093 | Eilersgaard | July 5, 1932 |
| 1,907,008 | Rockwell | May 2, 1933 |
| 1,925,728 | Fundom | Sept. 5, 1933 |

FOREIGN PATENTS

| Number | Country | Date |
|---|---|---|
| 195,307 | Great Britain | Mar. 29, 1923 |